United States Patent
Han

(10) Patent No.: US 10,114,491 B1
(45) Date of Patent: Oct. 30, 2018

(54) TOUCH-DISPLAY PANEL

(71) Applicant: LEADING UI CO., LTD., Anyang-si (KR)

(72) Inventor: Sang-Hyun Han, Anyang-si (KR)

(73) Assignee: LEADING UI Co., Ltd., Anyang-si (KR)

( * ) Notice: Subject to any disclaimer, the term of this patent is extended or adjusted under 35 U.S.C. 154(b) by 0 days.

(21) Appl. No.: 15/679,566

(22) Filed: Aug. 17, 2017

(51) Int. Cl.
*G06F 3/044* (2006.01)
*G06F 3/041* (2006.01)
*G09G 3/3208* (2016.01)
*G02F 1/1333* (2006.01)

(52) U.S. Cl.
CPC ........ *G06F 3/0412* (2013.01); *G02F 1/13338* (2013.01); *G06F 3/044* (2013.01); *G06F 3/0416* (2013.01); *G09G 3/3208* (2013.01)

(58) Field of Classification Search
CPC .. G06F 3/044; G06F 2203/04111–2203/04113
See application file for complete search history.

(56) References Cited

U.S. PATENT DOCUMENTS

| 2013/0050108 A1* | 2/2013 | Hong | G06F 3/0416 345/173 |
| 2013/0328830 A1* | 12/2013 | Han | G06F 3/0418 345/174 |
| 2014/0320438 A1 | 10/2014 | Yurlov et al. | |
| 2014/0326968 A1 | 11/2014 | Lee | |
| 2015/0022500 A1 | 1/2015 | Kita et al. | |
| 2015/0153876 A1* | 6/2015 | Chien | G06F 3/044 345/173 |
| 2016/0246393 A1* | 8/2016 | Lee | G06F 3/044 |
| 2016/0327820 A1* | 11/2016 | Wu | G02F 1/13338 |
| 2017/0139512 A1* | 5/2017 | Kim | G06F 3/044 |

FOREIGN PATENT DOCUMENTS

| JP | 2013-0242432 | 12/2013 |
| KR | 20-2014-0005769 | 11/2014 |
| KR | 10-2015-0136566 | 12/2015 |
| KR | 10-1482401 | 1/2016 |
| KR | 10-2016-0031294 | 3/2016 |

* cited by examiner

*Primary Examiner* — Sanghyuk Park
(74) *Attorney, Agent, or Firm* — LEEPI

(57) ABSTRACT

A touch-display panel having a touch sensing function and a display function are disclosed. A touch-display panel includes an organic light-emitting diode (OLED) panel and a touch-sensing wiring. The OLED panel displays an image through a plurality of sub-pixels. The touch-sensing wiring is formed on the OLED panel in a mesh shape to receive a driving signal from an external device and to output a sensing signal which varies in accordance with a touch. Here, the mesh shape includes a wiring portion having an I-shape and a bridge portion having an X-shape, and an edge formed at the wiring portion includes at least one of a round slit and a slit having an X-shape formed at the bridge portion.

10 Claims, 13 Drawing Sheets

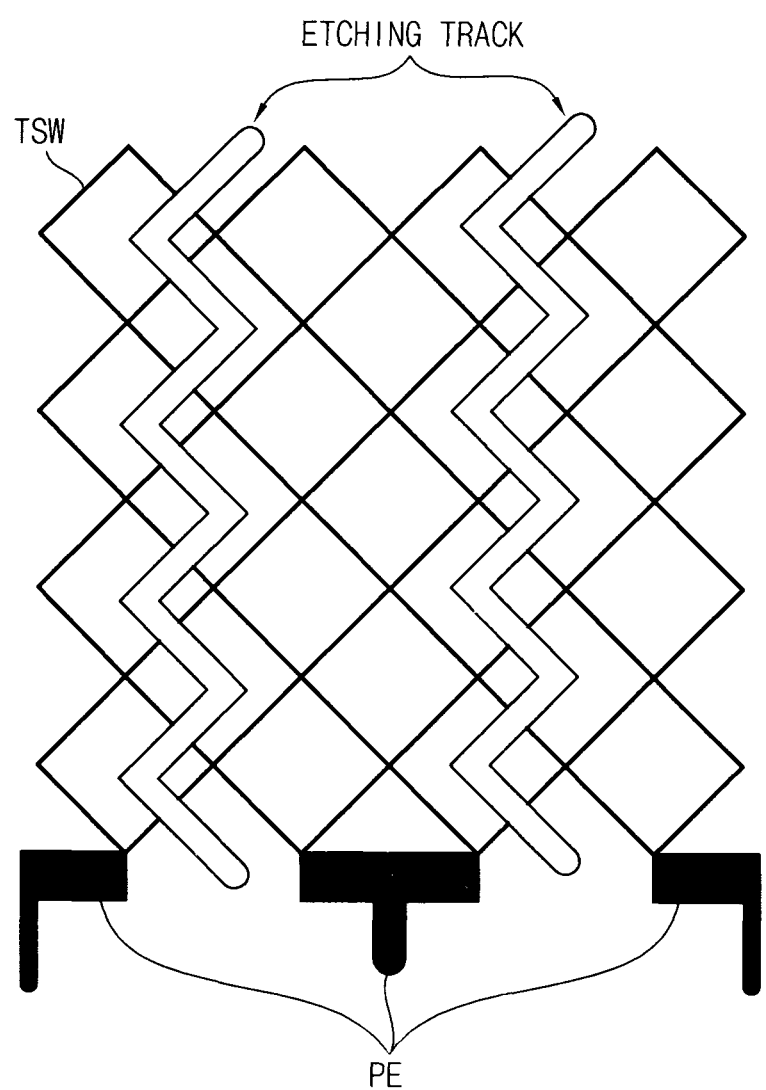

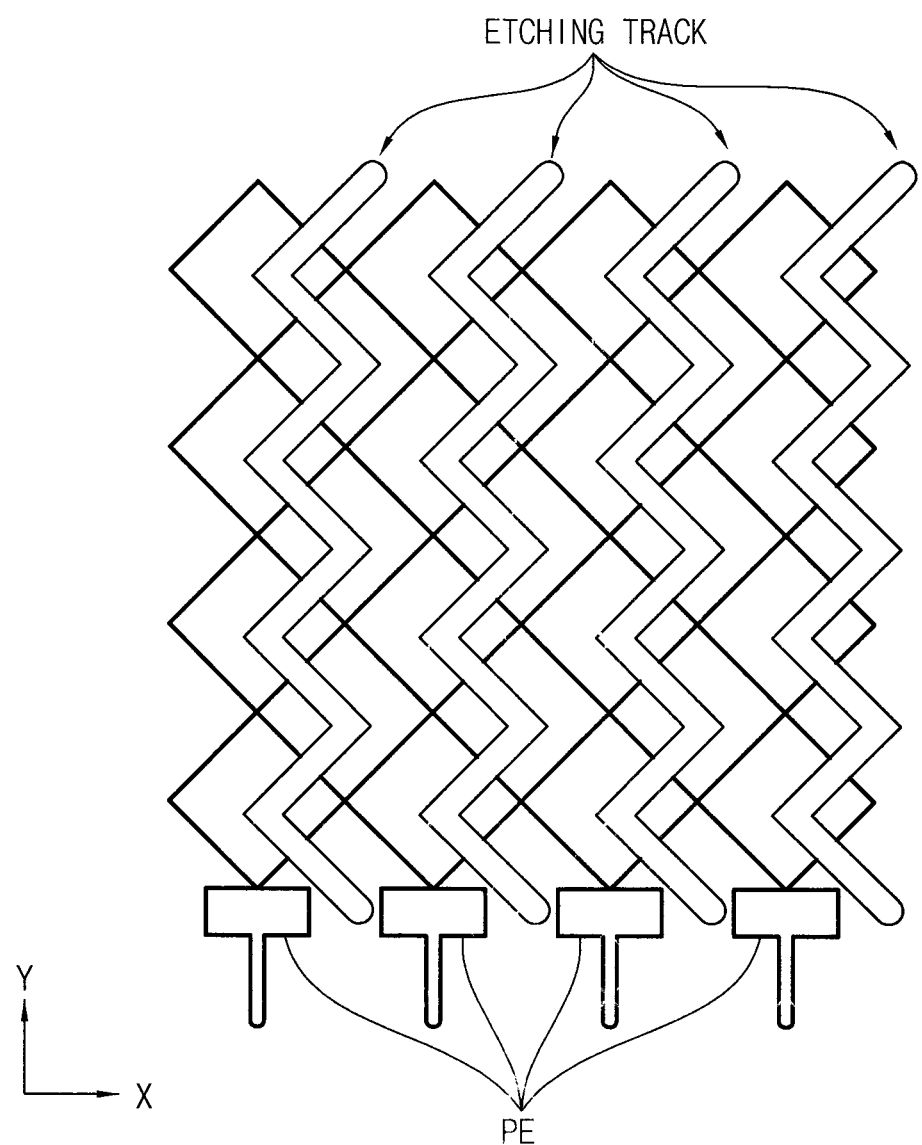

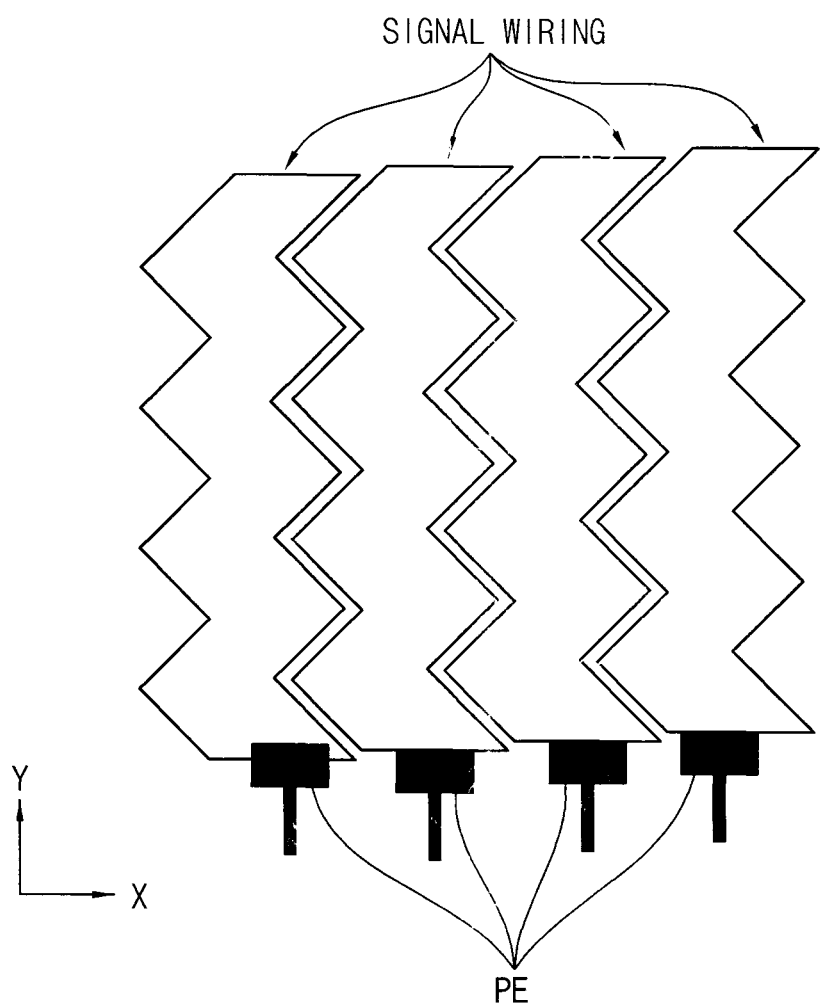

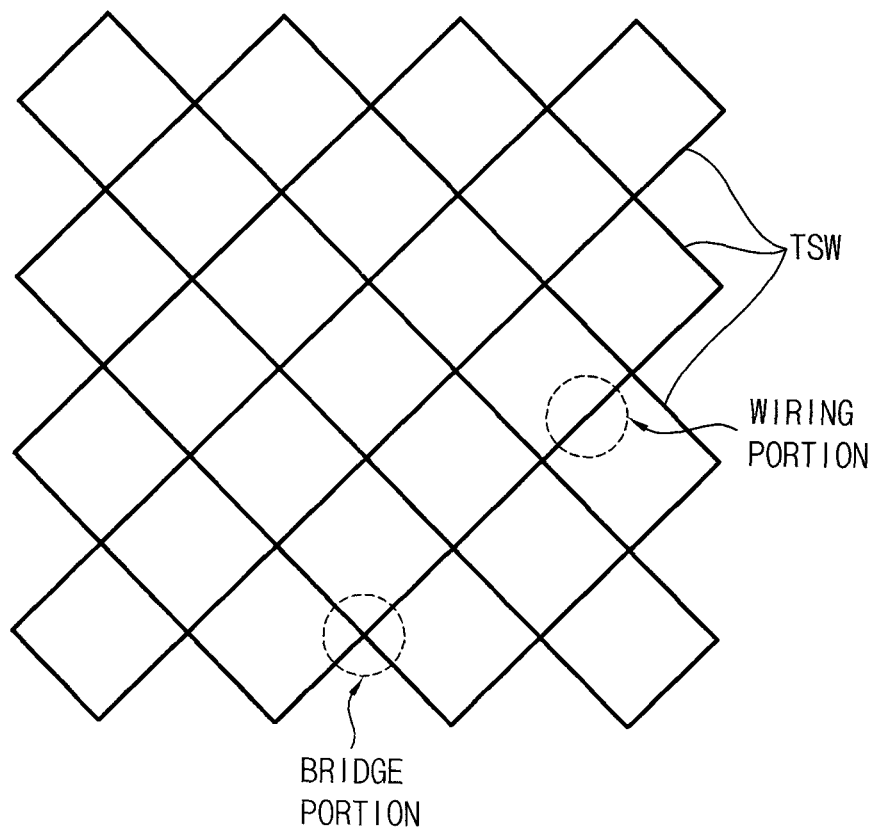

TOUCH-DISPLAY PANEL

BACKGROUND OF THE INVENTION

Technical Field

Exemplary embodiments of the present invention relate to a touch-display panel.

More particularly, exemplary embodiments of the present invention relate to a touch-display panel having a touch sensing function and a display function.

Discussion of the Related Art

As electronic engineering technology and information technology have repeatedly advanced, the importance of electronic devices in daily life including a work environment has been steadily increasing. In recent years, the types of electronic devices have diversified. In particular, in the field of portable electronic devices, such as mobile phones and Portable Multimedia Players (PMPs), a vast number of devices with new designs to which new functionalities have been added have been released almost every day.

As the types of electronic devices which people encounter in daily life have gradually diversified and the functionalities of electronic devices have become advanced and complicated, there has been an urgent need for a user interface which users can easily learn and which can be manipulated intuitively. Touch screen devices have attracted attention as input devices capable of meeting such a need, and have already been widely applied to a variety of electronic devices.

In particular, a touch screen device, which is the most general application product of a touch panel device, is a device that senses the location of a touch of a user on a display screen and performs overall control of the electronic device, including the control of the display screen, using information about the sensed location of the touch as input information.

In order to realize the touch panel device, electrodes are usually disposed on different layers. That is, a first electrode extending along in a first direction is formed in a first layer, and a second electrode extending along a second direction intersecting the first direction is disposed in a second layer to realize the touch panel device. As a result, the manufacturing cost of the touch panel device increases. In addition, the manufactured touch panel device must be arranged on a display panel displaying an image through a separate operation.

Meanwhile, an organic light-emitting diode (OLED) has a high response speed as a response speed of about 1 millisecond or less, low power consumption, and self light emission, thereby providing a wide viewing angle to have an advantage as an image display medium.

The principle of an OLED is that, when a voltage is applied, electrons and holes from a cathode and an anode, respectively, are injected into an organic compound layer, which is a light-emitting layer, so that the excitons to which the holes and electrons are bonded in the organic compound layer emit light while falling from an excited state to a ground state.

SUMMARY

Exemplary embodiments of the present invention provide a touch-display panel implemented by providing a touch sensing function to an OLED panel displaying an image.

According to one aspect of the present invention, a touch-display panel includes an organic light-emitting diode (OLED) panel and a touch-sensing wiring. The OLED panel displays an image through a plurality of sub-pixels. The touch-sensing wiring is formed on the OLED panel in a mesh shape to receive a driving signal from an external device and to output a sensing signal which varies in accordance with a touch. Here, the mesh shape includes a wiring portion having an I-shape and a bridge portion having an X-shape, and an edge formed at the wiring portion includes at least one of a round slit and a slit having an X-shape formed at the bridge portion.

In an exemplary embodiment of the present invention, the touch-sensing wiring may be formed integrally with the OLED panel.

In an exemplary embodiment of the present invention, the touch-sensing wiring may be formed on an encapsulation layer of the OLED panel.

In an exemplary embodiment of the present invention, the touch-sensing wiring may be formed to expose sub-pixels of the OLED panel when viewed in plan.

In an exemplary embodiment of the present invention, the touch-sensing wiring may include a plurality of main sensors and a plurality of sub-sensors. The main sensors are disposed in a touch area in a mesh shape. The sub-sensors are disposed along one line adjacent to each of the main sensors in a mesh shape. Here, the sub-sensors are disposed in a one-to-many type with respect to one main sensor.

In an exemplary embodiment of the present invention, the sub-sensors disposed on an imaginary line perpendicular to the longitudinal direction of the main sensor may be connected to each other.

In an exemplary embodiment of the present invention, the touch-sensing wiring may be opening along a first line connecting a first sub-pixel and a second sub-pixel of the OLED panel.

In an exemplary embodiment of the present invention, the first line may have a zigzag shape.

In an exemplary embodiment of the present invention, the mesh shape may be a shape that surrounds the sub-pixels.

In an exemplary embodiment of the present invention, a bent portion of the slit having an X-shape may be rounded According to a touch-display panel, the mesh-shaped touch-sensing wiring is formed on an area (or an area of a light-blocking layer) above an encapsulation layer of an OLED panel, thereby improving a visibility and increasing a transparency of the OLED light generated by self-emission.

BRIEF DESCRIPTION OF THE DRAWINGS

The above and other features and aspects of the present invention will become more apparent by describing in detailed exemplary embodiments thereof with reference to the accompanying drawings, in which:

FIG. 1A to FIG. 1C are plan views schematically illustrating a touch-display panel according to an exemplary embodiment of the present invention;

FIG. 3A is a plan view schematically illustrating an example of a touch-sensing wiring according to an exemplary embodiment of the present invention;

FIG. 3B is a plan view schematically illustrating the electrical characteristics of the touch-sensing wiring of FIG. 3A;

FIG. 5A is a plan view schematically illustrating a touch-sensing wiring according to the present invention;

DETAILED DESCRIPTION OF THE INVENTION

Figure 1A:
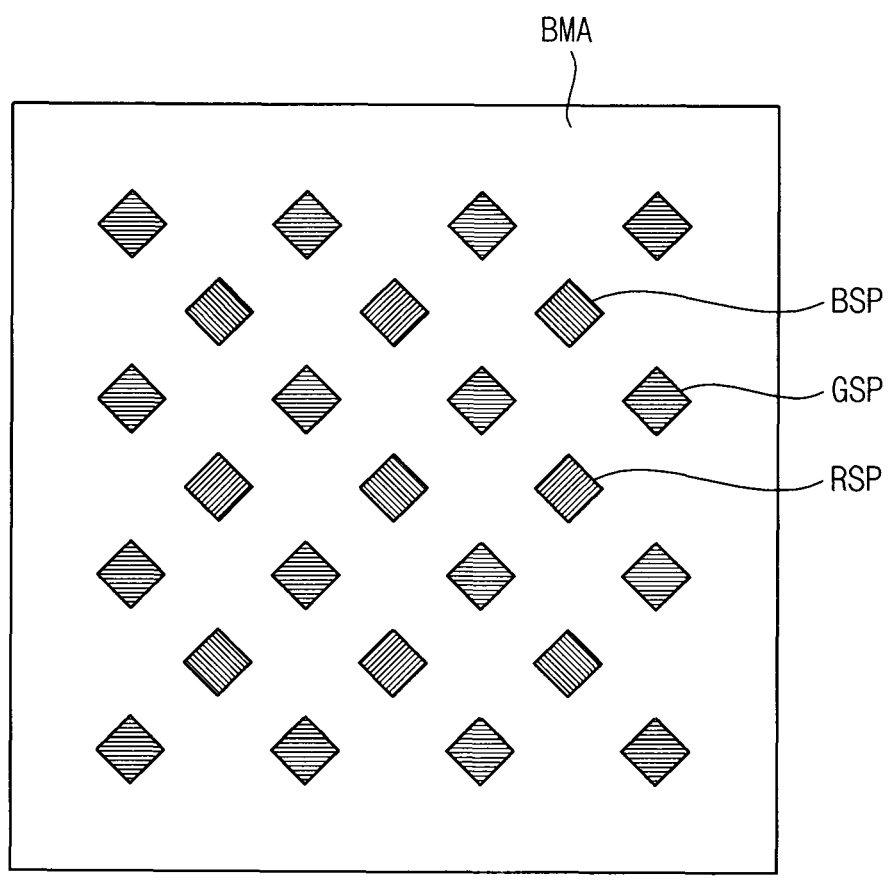

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1C:
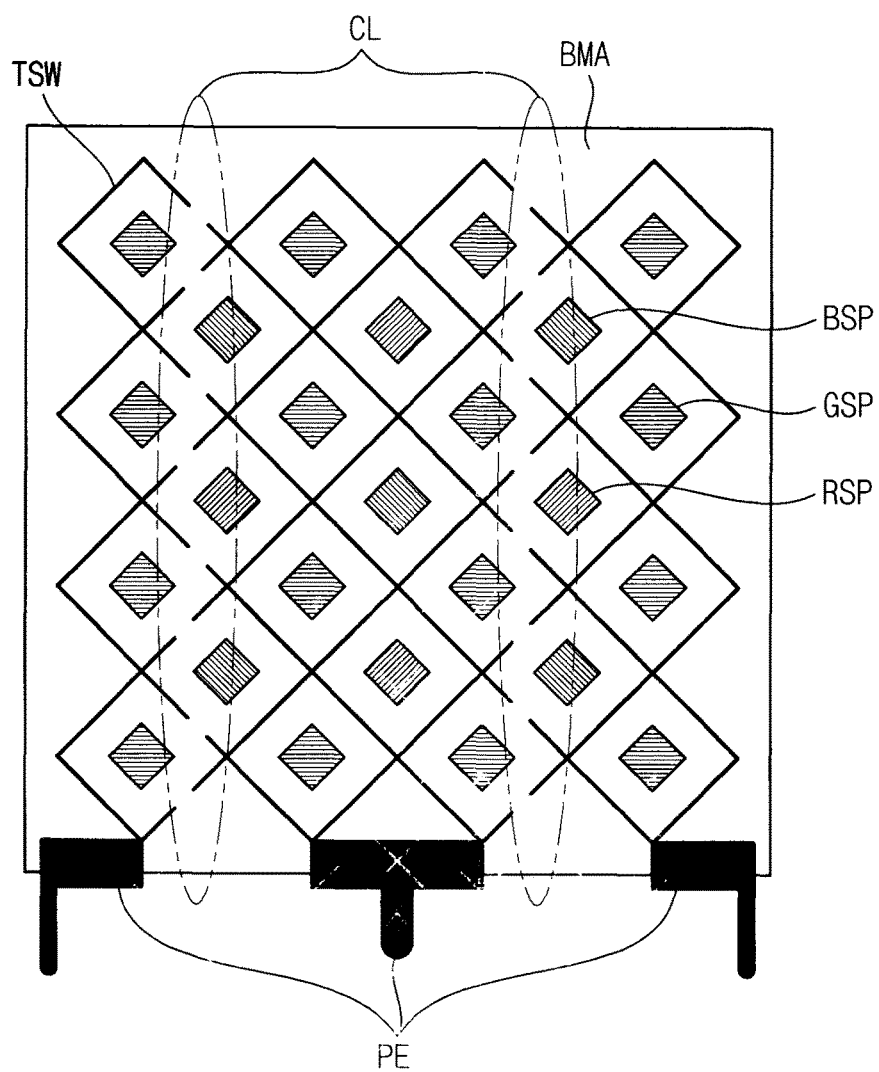

FIG. 1A to FIG. 1C are plan views schematically illustrating a touch-display panel according to an exemplary embodiment of the present invention. Particularly, FIG. 1A is a plan view schematically illustrating an OLED panel. FIG. 1B is a plan view schematically illustrating a touch-sensing wiring TSW. FIG. 1C is a plan view schematically illustrating a touch-display panel in which the touch-sensing wiring TSW of FIG. 1B is disposed and defined on the OLED panel of FIG. 1A.

Referring to FIG. 1A to FIG. 1C, an organic light-emitting diode (OLED) panel displays an image using an OLED, which is a self-luminous element, and includes a plurality of sub-pixels RSP, GSP and BSP, and a light-blocking area BMA surrounding the sub-pixels RSP, GSP and BSP. The light-blocking area BMA may be an encapsulating layer of an OLED panel. When moisture or oxygen is introduced into the OLED panel in which OLED elements are formed, the electrode material is oxidized and peeled, so that the lifetime of the OLED elements is shortened. Further, not only the luminous efficiency is lowered but also the problem of deterioration of luminescent color is generated. Therefore, in order to prevent such problem, the encapsulating layer functions to seal the OLED element to prevent moisture and oxygen from being penetrated.

The sub-pixels RSP, GSP and BSP may include a red sub-pixel RSP, a green sub-pixel GSP and a blue sub-pixel BSP to display various color images. Typically three sub-pixels may define one pixel. The red sub-pixels RSP, the green sub-pixels GSP and the blue sub-pixels BSP may be arranged in various forms such as a stripe type, a penta type, and the like.

The stripe type is a form in which sub-pixels of the same color are arranged in columns. However, when the sub-pixels are arranged in the stripe type, an aperture ratio is lowered by a black matrix positioned between the respective sub-pixels, and a high-resolution display capability may be degraded.

In the present exemplary embodiment, the sub-pixels RSP, GSP and BSP may be arranged in a pentagonal (Pentile matrix sub-pixel array structure). That is, the red sub-pixel RSP and the blue sub-pixel BSP are alternately formed in the same column, and a green sub-pixel GSP is formed in the adjacent column. In a case of the Pentile matrix sub-pixel array structure, a high-resolution expression capability is improved, and the vertical line pattern by the specific sub-pixel is not recognized, thereby improving the image quality. In the present exemplary embodiment, the size of the red sub-pixel RSP and the size of the blue sub-pixel BSP may be equal to each other, and the size of the red sub-pixel RSP is larger than the size of the green sub-pixel GSP.

The touch-sensing wiring TSW is integrally formed on the OLED panel in a mesh form. In particular, the touch-sensing wiring TSW is formed in the light-blocking area BMA formed in the OLED panel. Thus, the sub-pixels RSP, GSP and BSP and the touch-sensing wiring TSW do not overlap with each other when viewed in a plane. In particular, the touch-sensing wiring TSW is formed to expose sub-pixels RSP, GSP and BSP of the OLED panel when viewed in a plane.

As shown in FIG. 1B and FIG. 1C, the touch-sensing wiring TSW is opened along a first line connecting a first sub-pixel and a second sub-pixel of the OLED panel. The first line has a zigzag shape.

As described above, the touch-sensing wiring of a mesh form is formed in an area (or an area of the light-blocking layer) on the encapsulation layer of the OLED panel, thereby improving the visibility and the transmittance of the OLED light.

Figure 2:
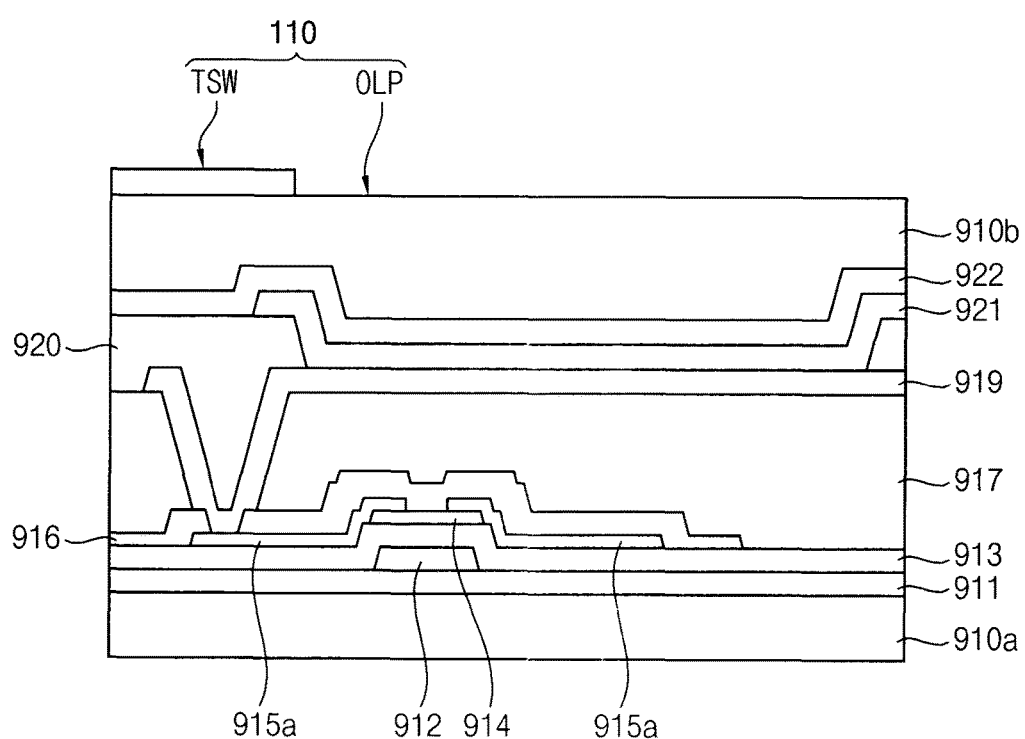
FIG. 2 is a cross-sectional view schematically illustrating a touch-display panel according to an exemplary embodiment of the present invention.

FIG. 2 is a cross-sectional view schematically illustrating the touch-display panel 110 shown in FIG. Particularly, an example in which the touch-sensing wiring TSW is formed on a top surface of the OLED panel OLP is shown.

Referring to FIG. 2, the touch-display panel 110 includes an OLED panel OLP displaying an image through a plurality of sub-pixels and a touch-sensing wiring TSW formed on the OLED panel OLP. The touch-sensing wiring TSW receives a driving signal from an external device to output a sensing signal varying in accordance with a touch to an external device.

The OLED panel OLP includes a base substrate 910a having a display area defined by sub-pixels formed in a matrix form, and an encapsulation layer 910b for protecting the sub-pixels from moisture or oxygen. In the present exemplary embodiment, the OLED panel OLP is a top emission type emitting light in the direction of the encapsulation layer 910b.

The sub-pixels may be formed as a passive matrix or an active matrix. In the case that the sub-pixels are formed in an active matrix type, it may be configured with a two transistors-one capacitor (2T-1C) structure including a switching transistor, a driving transistor, a capacitor and an organic light-emitting diode, or a structure in which a transistor and a capacitor are further added. Hereinafter, the structure of the sub-pixel will be described in more detail.

A buffer layer 911 is disposed on the base substrate 910a. The buffer layer 911 may be formed to protect a thin-film transistor formed in a following process from an impurity such as alkali ions or the like, which is emitted from the base substrate 910a.

The buffer layer 911 may be formed of silicon oxide (SiOx), silicon nitride (SiNx), or the like. A gate electrode 912 is disposed on the buffer layer 911.

The gate electrode 912 may include any one selected from the group consisting of molybdenum (Mo), aluminum (Al), chromium (Cr), gold (Au), titanium (Ti), nickel (Ni), neodymium (Nd), copper (Cu), and alloys thereof. The gate electrode 912 may be formed in a single-layer or multilayer structure.

A first insulation film 913 is disposed on the gate electrode 912. The first insulation layer 913 may be a silicon oxide layer (SiOx), a silicon nitride layer (SiNx), or a multilayer thereof, but it is not limited thereto.

An active layer 914 is disposed on the first insulation film 913. The active layer 914 may include amorphous silicon or polycrystalline silicon crystallized therefrom. Although not shown in FIG. 2, the active layer 914 may include a channel area, a source area and a drain area. The source area and the drain area may be doped with P-type or N-type impurities. Moreover, the active layer 914 may include an ohmic contact layer for lowering the contact resistance. A source electrode 915a and a drain electrode 915b are disposed on the active layer 914.

Each of the source electrode 915a and the drain electrode 915b may be a single layer or a multilayer. When each of the source electrode 915a and the drain electrode 915b is formed as a single layer, each of the source electrode 915a and the drain electrode 915b may include any one selected from the group consisting of molybdenum (Mo), aluminum (Al), chromium (Cr), gold (Au), titanium (Ti), nickel (Ni), neodymium (Nd), copper (Cu), and alloys thereof. When each of the source electrode 915a and the drain electrode 915b is formed as a multilayer, each of the source electrode 915a and the drain electrode 915b may be a double layer of molybdenum/aluminum-neodymium, a triple layer of molybdenum/aluminum/Molybdenum or a triple layer of molybdenum/aluminum-neodymium/molybdenum.

A second insulation film 916 is disposed on the source electrode 915a and the drain electrode 915b. The second insulation film 916 may be a silicon oxide film (SiOx), a silicon nitride film (SiNx), or a multilayer thereof, but it is not limited thereto. The second insulation layer 916 may be a passivation film.

A third insulation film 917 is disposed on the second insulation film 916. The third insulation film 917 may be a silicon oxide film (SiOx), a silicon nitride film (SiNx), or a multilayer thereof, but it is not limited thereto. The third insulation film 917 may be a planarization film.

A bottom gate type driving transistor disposed on the base substrate 910a has been described above.

Hereinafter, an organic light-emitting diode disposed on a driving transistor will be described.

A first electrode 919 is disposed on the third insulation film 917. The first electrode 919 may be selected as an anode or a cathode. The first electrode 919 selected as the anode may include a transparent material such as indium-tin oxide (ITO) or indium zinc oxide (IZO), but it is not limited thereto.

A bank layer 920 having an opening exposing a portion of the first electrode 919 is disposed on the first electrode 919. The bank layer 920 may include organic materials such as benzocyclobutene (BCB) resin, an acrylic series resin or a polyimide-series resin, but it is not limited thereto.

The organic light emitting layer 921 is disposed in the opening of the bank layer 920. The organic light emitting layer 921 includes a hole injection layer, a hole transport layer, a light-emitting layer, an electron transport layer and an electron injection layer.

The hole injection layer may function to smoothly perform the injection of holes. The hole injection layer may be formed of at least one selected from the group consisting of copper phthalocyanine (CuPc), PEDOT (poly(3,4)-ethylene-dioxythiophene), polyaniline (PANT) and NPD (N,N-di-naphthyl-N,N'-diphenyl benzidine). Other materials may be used.

The hole transport layer may function to smoothly perform the transport of holes. The hole transport layer may be formed of at least one selected from the group consisting of NPD (N,N-dinaphthyl-N,N'-diphenyl benzidine), TPD (N,N'-bis-(3-methylphenyl)-N,N'-bis-(phenyl)-benzidine, s-TAD and MTDATA (4,4',4"-Tris(N-3-methylphenyl-N-phenyl-amino)-triphenylamine). Other materials may be used.

The light-emitting layer includes a host and a dopant. The light-emitting layer may be formed using a material capable of emitting red, green, blue, and white light, for example, a phosphorescence material or a fluorescence material. In case the light-emitting layer emits red light, the light-emitting layer includes a host material including carbazole biphenyl (CBP) or N,N-dicarbazolyl-3,5-benzene (mCP). Further, the light-emitting layer may be formed of a phosphorescence material including a dopant containing at least one selected from the group consisting of PIQIr(acac)(bis(1-phenyliso-quinoline)acetylacetonate iridium), PQIr(acac)(bis(1-phenyl quinoline)acetylacetonate iridium), PQIr(tris(1-phenylqui-noline)iridium) and PtOEP(octaethylporphyrin platinum) or a fluorescence material containing PBD:Eu(DBM)3(Phen) or Perylene. Other materials may be used. In case the light-emitting layer emits green light, the light-emitting layer includes a host material containing CBP or mCP. Further, the light-emitting layer may be formed of a phosphorescence material including a dopant containing Ir(ppy)3(fac tris(2-phenylpyridine)iridium) or a fluorescence material containing Alq3(tris(8-hydroxyquinolino)aluminum). Other materials may be used. In case the light-emitting layer emits blue light, the light-emitting layer includes a host material containing CBP or mCP. Further, the light-emitting layer may be formed of a phosphorescence material including a dopant containing (4,6-F2 ppy)2Irpic or a fluorescence material containing any one selected from the group consisting of spiro-DPVBi, spiro-6P, distyryl-benzene (DSB), di styryl-arylene (DSA), PFO-based polymer, PPV-based polymer and a combination thereof. Other materials may be used.

The electron transport layer may function to smoothly perform the transport of electrons. The electron transport layer may be formed of at least one selected from the group consisting of Alq3(tris(8-hydroxyquinolino)aluminum, PBD, TAZ, Spiro-PBD, BAlq, and SAlq. Other materials may be used.

The electron injection layer may functions to smoothly perform the injection of electrons. The electron injection layer may be formed of Alq3(tris(8-hydroxyquinolino)aluminum), PBD, TAZ, Spiro-PBD, BAlq, SAlq, or LiF. Other materials may be used. In the present exemplary embodiment of the invention, at least one of the hole injection layer, the hole transport layer, the electron transport layer and the electron injection layer may be omitted.

A second electrode 922 is disposed on the organic light-emitting layer 921. The second electrode 922 may be selected as an anode electrode or a cathode electrode. When the second electrode 922 is selected as a cathode electrode, the second electrode 922 may be formed of aluminum (Al). Other materials may be used for the second electrode 922.

The touch-sensing wiring TSW is disposed in an area corresponding to the bank layer 920 on the top surface of the encapsulation layer 910b.

FIG. 3A is a plan view schematically illustrating an example of a touch-sensing wiring TSW according to an embodiment of the present invention. FIG. 3B is a plan view schematically illustrating the electrical characteristics of the touch-sensing wiring TSW of FIG. 3A.

Referring to FIG. 3A and FIG. 3B, after a conductive line is formed in a mesh shape, rectangular lines are cut so that one zigzag line of the zigzag lines parallel to an Y-axis direction remains. The rectangular line may be removed through an etching process along an etching track. Meanwhile, a zigzag line may be formed in a process of forming a mesh-shaped conductive line by a method in which the corresponding line is not formed.

Thus, the conductive lines adjacent to each other are physically separated by the etching track to form the touch-sensing wiring TSW.

Figure 4A:
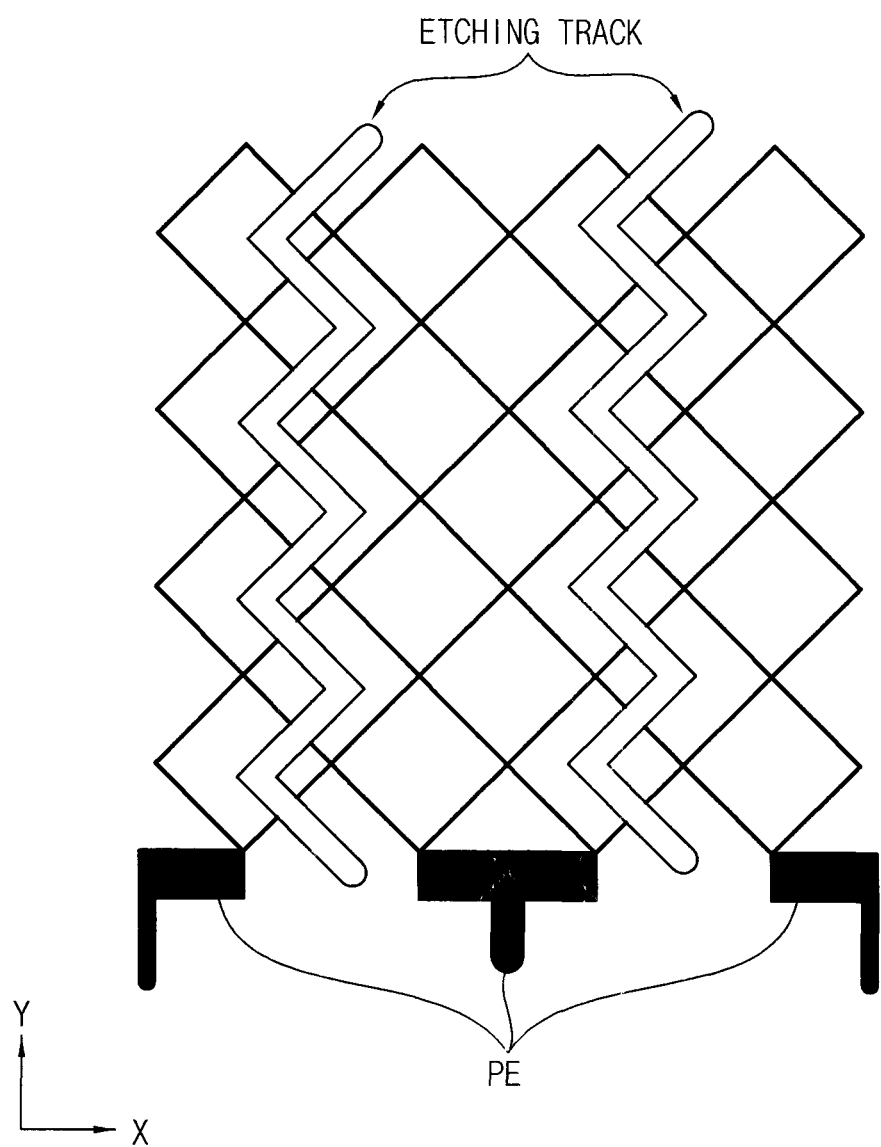
FIG. 4A is a plan view schematically illustrating another example of a touch-sensing wiring according to an exemplary embodiment of the present invention.
Figure 4B:
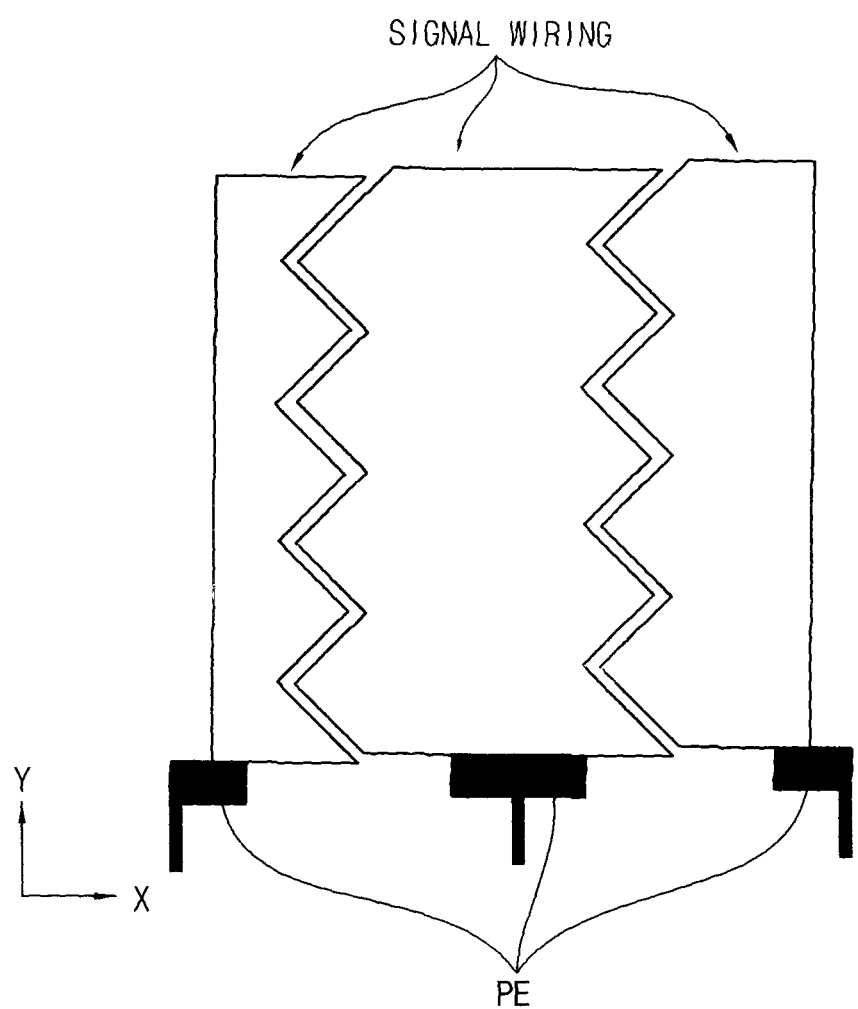
FIG. 4B is a plan view schematically illustrating the electrical characteristics of the touch-sensing wiring of FIG. 4A.

FIG. 4A is a plan view schematically illustrating another example of a touch-sensing wiring TSW according to an exemplary embodiment of the present invention. FIG. 4B is a plan view schematically illustrating the electrical characteristics of the touch-sensing wiring TSW of FIG. 4A.

FIG. 4A and FIG. 4B, after a conductive line is formed in a mesh shape, the rectangular lines are cut so that two zigzag lines of the zigzag lines parallel to an Y-axis direction remain. The rectangular line may be removed along an etch track through an etching process. Meanwhile, a zigzag line may be formed in a process of forming a mesh-shaped conductive line by a method in which the corresponding line is not formed.

Therefore, conductive lines adjacent to each other may be physically separated by the etching track to form the touch-sensing wiring TSW.

FIG. 5A is a plan view schematically illustrating a touch-sensing wiring TSW according to the present invention. As shown in FIG. 5A, the touch-sensing wiring TSW has a mesh shape. Thus, the touch-sensing wiring TSW includes a wiring portion having an I-shape and a bridge portion having an X-shape.

Figure 5B:
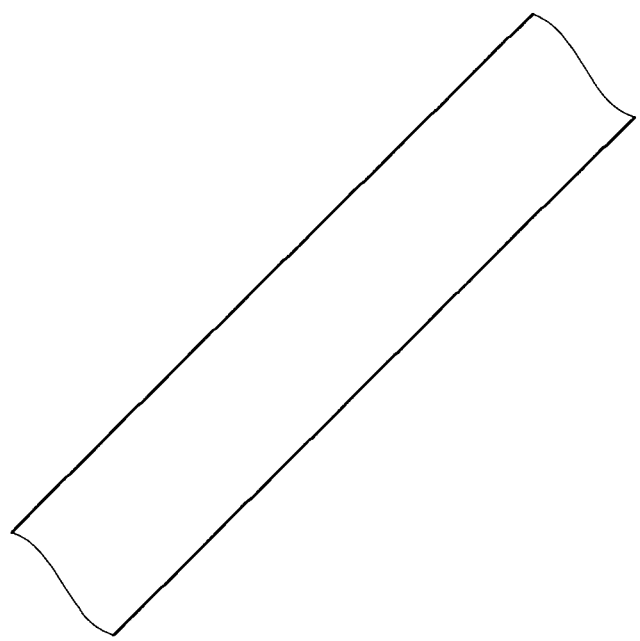
FIG. 5B is a schematic view schematically illustrating an example of the wiring portion in FIG. 5A.

FIG. 5B is a schematic view schematically illustrating an example of the wiring portion in FIG. 5A. As shown in FIG. 5B, the wiring portion may have a plate shape in which holes or grooves are not formed.

Figure 5C:
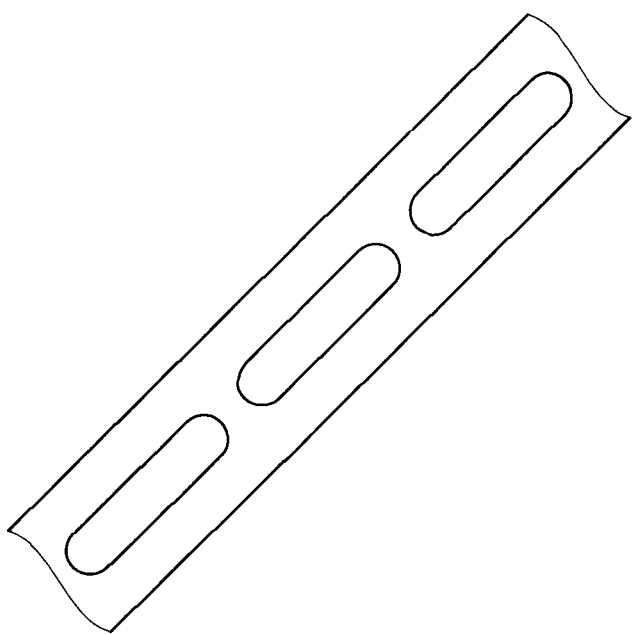
FIG. 5C is a schematic view schematically illustrating another example of the wiring portion in FIG. 5A.

FIG. 5C is a schematic view schematically illustrating another example of the wiring portion in FIG. 5A. As shown in FIG. 5C, in a touch-sensing wiring TSW of a mesh shape, a slit having a uniform width and rounded corners is formed in an I-shaped wiring portion. The slit extends along an extending direction of the wiring. In the case of the touch-sensing wiring TSW having the wiring portion shown in FIG. 5C, the slits having a long width in the left-right direction are formed at a central portion of the wiring along a length direction, so that flexibility may be improved in compare with the wiring portion shown in FIG. 5B.

Figure 5D:
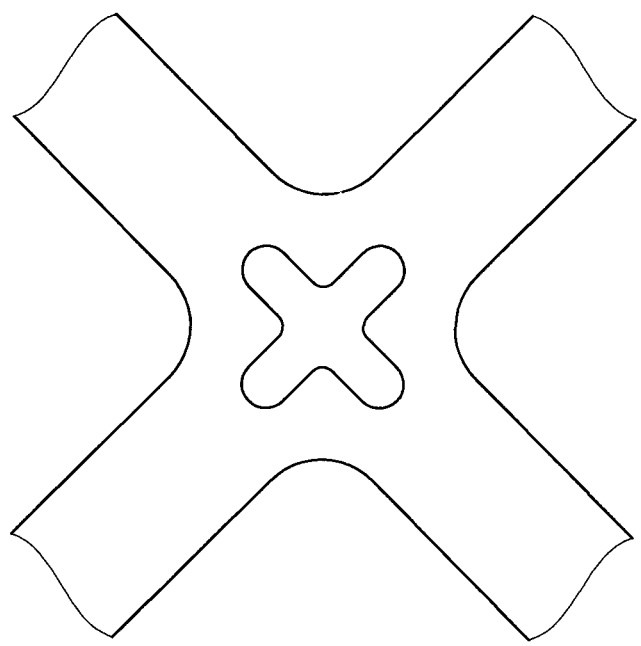
FIG. 5D is a schematic view schematically illustrating an example of the bridge portion in FIG. 5A.

FIG. 5D is a schematic view schematically illustrating an example of the bridge portion in FIG. 5A. As shown in FIG. 5D, an X-shaped slit is formed in a crossing area of the X-shaped bridge portion. Here, bent portions of the X-shaped slit are rounded.

Figure 5E:
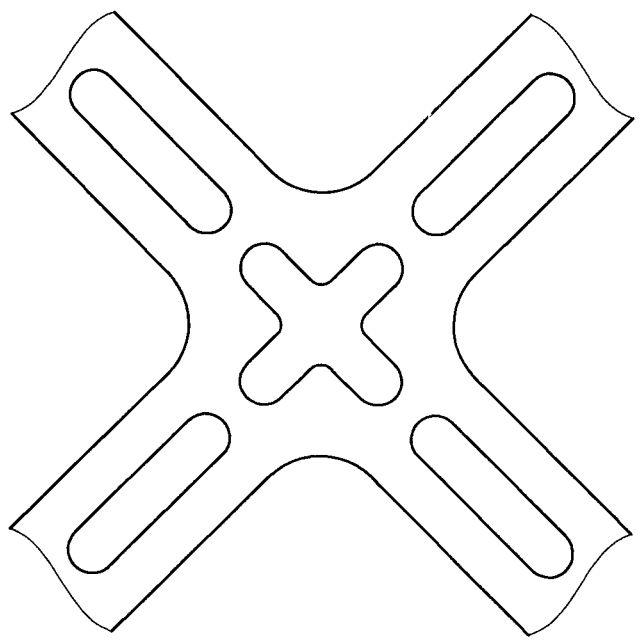
FIG. 5E is a schematic view schematically illustrating another example of the bridge portion in FIG. 5A.

FIG. 5E is a schematic view schematically illustrating another example of the bridge portion in FIG. 5A. As shown in FIG. 5E, an X-shaped slit is formed in a central area of the X-shaped bridge portion, and a slit having rounded corners is formed in an area deviated from the central area. Here, the bent portions of the X-shaped slit are rounded.

In particular, the touch-sensing wiring TSW, which has wiring portions and bridge portions of various shapes described in FIG. 5C to FIG. 5E, is excellent in bending performance. Therefore, even if the above-described touch-sensing wiring TSW is employed in the flexible OLED panel, the reliability of the sensor may be increased.

Figure 6A:
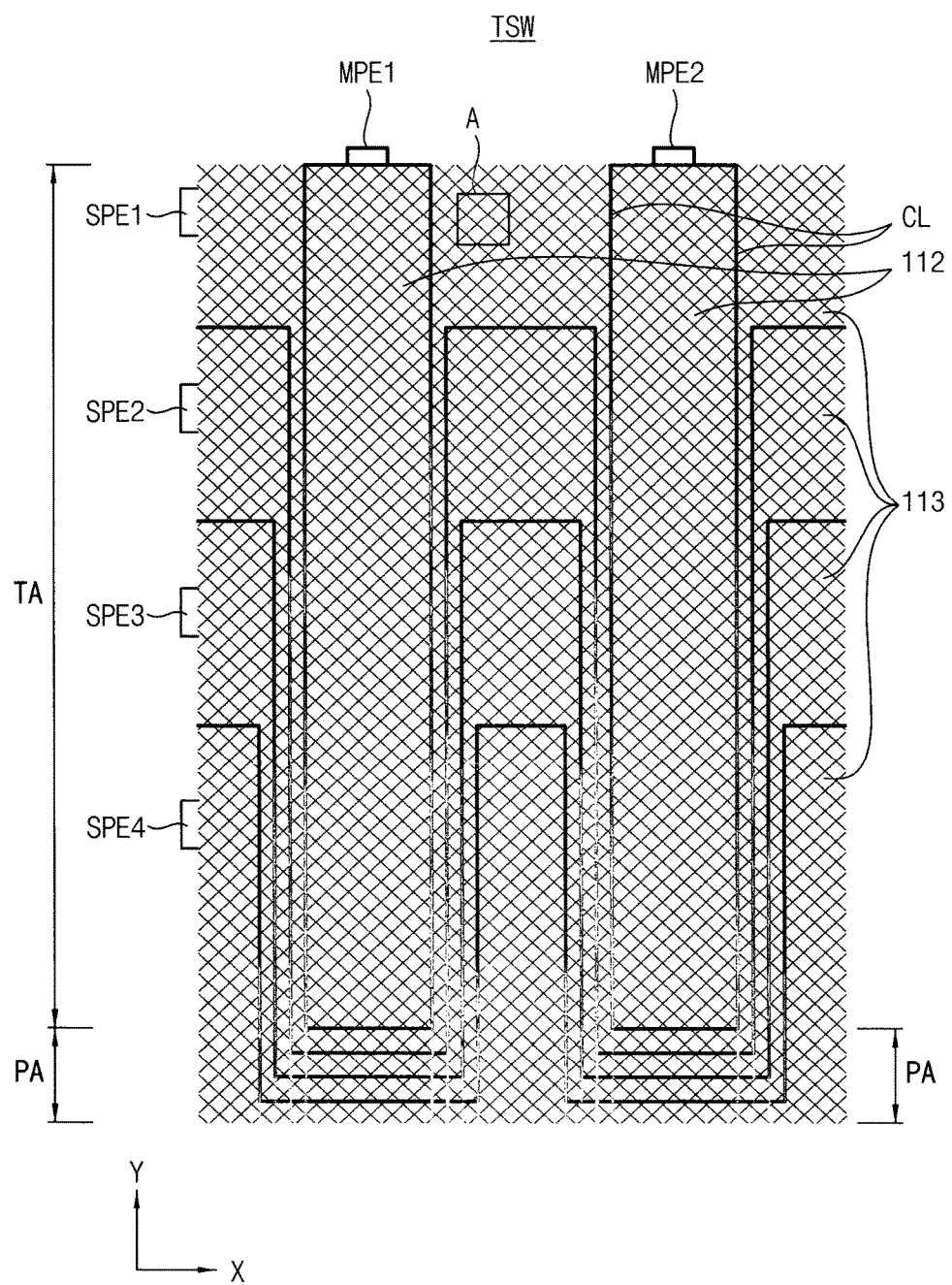
FIG. 6A is a plan view schematically illustrating a touch-display panel according to another exemplary embodiment of the present invention.
Figure 6B:
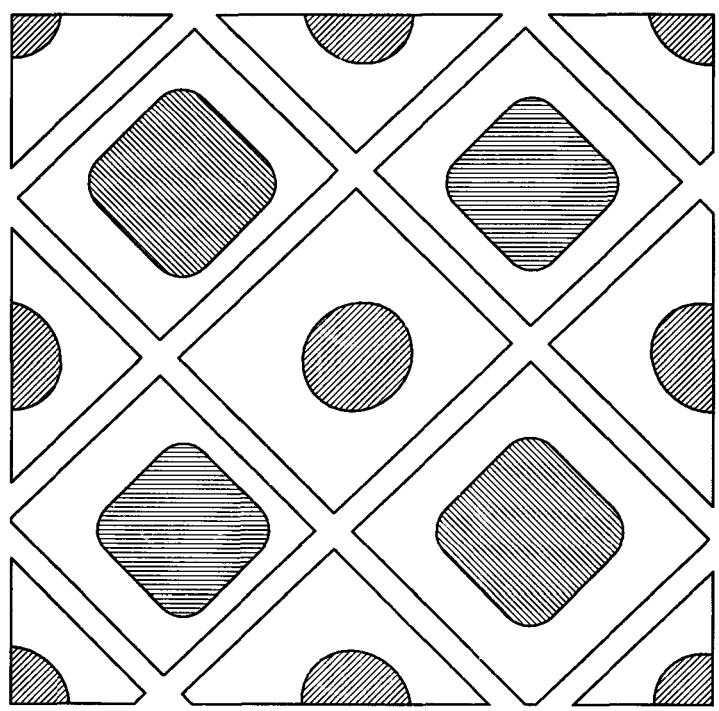
FIG. 6B is an enlarged view of the area 'A' in FIG. 6A.

FIG. 6A is a plan view schematically illustrating a touch-display panel according to another exemplary embodiment of the present invention, and FIG. 6B is an enlarged view of the area 'A' in FIG. 6A. In particular, it is described that main sensors having a length corresponding to one side of the OLED panel and sub-sensors disposed along one line in parallel with the main sensors are alternately disposed to be defined as one sensing group.

FIG. 6A and FIG. 6B, a touch-sensing wiring line TSW is disposed along one line adjacent to each of the main sensors 112 and the main sensors 112, respectively. The touch-sensing wiring TSW includes a plurality of sub-sensors 113 disposed in a one-to-many type with respect to one main sensor 112. The main sensors 112 and the sub-sensors 113 have a mesh shape. The main sensors 112 and the sub-sensors 113 are separated from each other through a cutting line CL.

In the present exemplary embodiment, the main sensors 112 and the sub-sensors 113 disposed along one line are alternately disposed. That is, a structure in which plural sub-sensors 113 are disposed along one line adjacent to one main sensor 112 is repeated. In the present exemplary embodiment, the sub-sensors 113 disposed on an imaginary line perpendicular to a longitudinal direction of the main sensor 112 are connected to each other.

The main sensors 112 are disposed in the touch area TA to sense a touch position of the first axis. In the present exemplary embodiment, a second axis is an Y-axis when the first axis is an X-axis, and the second axis is an X-axis when the first axis is an Y-axis. Each of the main sensors 112 having a rod shape is extended along an Y-axis direction, and is disposed along an X-axis direction. Each of the main sensors 112 has a uniform width.

The sub-sensors 113 are disposed in an one-to-many type in parallel with the main sensors 112 to sense touch positions of a second axis. Each of the sub-sensors 113 is disposed between adjacent main sensors 112, and is extended along the Y-axis direction to be disposed along the X-axis direction. The sub-sensors 113 are disposed adjacent to one main sensor 112.

The main sensors 112 and the sub-sensors 113 may include a metal mesh, a silver nanowire, or a carbon nanotube having a constant resistance per unit area. Further, the main sensors 112 and the sub-sensors 113 may include a silver material, a metal material, a graphene material, or the like. In the present embodiment, for convenience of explanation, it is described that the number of main sensors 112 is two and the number of sub-sensors 113 arranged along one line is four, but it is not limited thereto.

Each of the main sensors 112 is connected to a main pad electrode for connecting to a capacitance measurement circuit (not shown), and each of the sub-sensors 113 is connected to a sub-pad electrode for connecting to the capacitance measurement circuit (not shown). Reference numeral MPE1 is a first main pad electrode connected to a first main sensor, and reference numeral MPE2 is a second main pad electrode connected to a second main sensor. Similarly, reference numeral SPE1 is a first sub-pad electrode connected to a first sub-sensor, reference numeral SPE2 is a second sub-pad electrode connected to a second sub-sensor, reference numeral SPE3 is a third sub-pad electrode connected to a third sub-sensor, and reference numeral SPE4 is a fourth sub-pad electrode connected to a fourth sub-sensor.

The capacitance measurement circuit (not shown) is connected to both ends of each of the main sensors 112 and the sub-sensors 113 to sense a capacitance variation of the main sensors 112 and the sub-sensors 113 to measure the touch position.

In the above description, the cutting line separating the main sensor and the sub-sensor has a linear shape. That is, it has been described that the main sensors and the sub-sensors are formed in a rectangular shape by the cutting line having the linear shape. Accordingly, the touch-sensing wirings are formed on the OLED panel in a structure in which plural sub-sensors having a rectangular shape are arranged on both sides of the main sensor having a rod shape when viewed in a plane.

Meanwhile, the cutting line separating the main sensor and the sub-sensor may have a zigzag shape. That is, since the cutting line has a zigzag shape, each of the main sensors may be formed in a zigzag shape, and each of the sub-sensors may be formed in a diamond shape. Accordingly, the touch-sensing wirings are formed on the OLED panel in a structure in which plural sub-sensors having a diamond shape are arranged on both sides of the main sensor having a zigzag shape when viewed in a plane.

As described above, according to the present exemplary embodiment, since the main sensors and the sub-sensors are disposed on the same plane, the OLED panel of a single-layer structure may be realized.

Further, since the main sensors and the sub-sensors are independently connected to realize the capacitive touch panel, multi-touch may be achieved.

Furthermore, since one main connection wiring is connected to the main sensor and sub-sensors disposed adjacent to the main sensor are connected in series to be connected to the capacitance measurement circuit, the wiring complexity may be reduced in the touch area.

Having described exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A touch-display panel comprising:
   an organic light-emitting diode (OLED) panel displaying an image through a plurality of sub-pixels; and a touch-sensing wiring formed on the OLED panel in a mesh shape to receive a driving signal from an external device and to output a sensing signal which varies in accordance with a touch, wherein the mesh shape comprises a wiring portion having an I-shape and a bridge portion having an X-shape, and an edge formed at the wiring portion comprises at least one of a round slit and a slit having an X-shape formed at the bridge portion.

2. The touch-display panel of claim 1, wherein the touch-sensing wiring is formed integrally with the OLED panel.

3. The touch-display panel of claim 1, wherein the touch-sensing wiring is formed on an encapsulation layer of the OLED panel.

4. The touch-display panel of claim 1, wherein the touch-sensing wiring is formed to expose sub-pixels of the OLED panel when viewed in plan.

5. The touch-display panel of claim 1, wherein the touch-sensing wiring comprises:

a plurality of main sensors disposed in a touch area in a mesh shape; and a plurality of sub-sensors disposed along one line adjacent to each of the main sensors in a mesh shape, wherein the sub-sensors are disposed in a one-to-many type with respect to one main sensor.

6. The touch-display panel of claim 5, wherein the sub-sensors disposed on an imaginary line perpendicular to the longitudinal direction of the main sensor are connected to each other.

7. The touch-display panel of claim 1, wherein the touch-sensing wiring is open along a first line connecting a first sub-pixel and a second sub-pixel of the OLED panel.

8. The touch-display panel of claim 7, wherein the first line has a zigzag shape.

9. The touch-display panel of claim 1, wherein the mesh shape is a shape that surrounds the sub-pixels.

10. The touch-display panel of claim 1, wherein a bent portion of the slit having an X-shape is rounded.

* * * * *